United States Patent
Gourlay et al.

(10) Patent No.: US 7,516,211 B1
(45) Date of Patent: Apr. 7, 2009

(54) METHODS AND APPARATUS TO CONFIGURE A COMMUNICATION PORT

(75) Inventors: Douglas A. Gourlay, Sausalito, CA (US); Prashant P. Gandhi, San Jose, CA (US); Omar G. Abuabara, San Francisco, CA (US); Sachin Gupta, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 968 days.

(21) Appl. No.: 10/634,345

(22) Filed: Aug. 5, 2003

(51) Int. Cl.
*G06F 15/173* (2006.01)

(52) U.S. Cl. ............... 709/224; 709/223; 709/245; 370/356; 370/419

(58) Field of Classification Search .......... 709/224, 709/228
See application file for complete search history.

(56) References Cited

U.S. PATENT DOCUMENTS

| | | | | |
|---|---|---|---|---|
| 4,270,202 | A | 5/1981 | Stuttard et al. | 370/468 |
| 5,526,489 | A | 6/1996 | Nilakantan et al. | 709/228 |
| 5,926,501 | A | 7/1999 | Souissi et al. | 375/131 |
| 6,038,600 | A | 3/2000 | Faulk, Jr. et al. | 709/224 |
| 6,243,747 | B1 * | 6/2001 | Lewis et al. | 709/220 |
| 6,269,398 | B1 * | 7/2001 | Leong et al. | 709/224 |
| 6,389,359 | B1 | 5/2002 | Potter et al. | 701/213 |
| 6,446,200 | B1 * | 9/2002 | Ball et al. | 709/220 |
| 6,470,013 | B1 | 10/2002 | Barach et al. | 370/392 |
| 6,553,489 | B1 | 4/2003 | Osler et al. | 713/1 |
| 6,687,486 | B2 | 2/2004 | Grzeczkowski | 455/3.05 |
| 6,801,331 | B1 * | 10/2004 | Motoyama | 358/1.15 |
| 7,024,548 | B1 * | 4/2006 | O'Toole, Jr. | 709/220 |
| 7,174,371 | B2 * | 2/2007 | Elo et al. | 709/220 |
| 7,243,143 | B1 * | 7/2007 | Bullard | 709/223 |
| 7,376,717 | B2 * | 5/2008 | Bhogal et al. | 709/220 |

OTHER PUBLICATIONS

Port Based VLAN User's Guide. Cabletron Systems. 1997. Retrieved from <http://secure.enterasys.com/support/manuals/hardware/2263.pdf>.*
Newman et al. Ipsilon's General Switch Management Protocol Specification Version 1.1—RFC 1987. Aug. 1996. <http://www.faqs.org/rfcs/rfc1987.html>.*

* cited by examiner

*Primary Examiner*—Larry D Donaghue
*Assistant Examiner*—Jeffrey R Swearingen

(57) ABSTRACT

A data communication device automatically configures its own communication ports based on attributes of a remote device with which it communicates. The process of configuring the communication ports includes monitoring a communications protocol associated with a remote device on a given communication port of the data communication device without participating in the communications protocol. The data communication device detects an attribute such as a network address associated with the remote device based on the monitored communications. In response to detecting the attribute of the remote device, the data communication device selects one of multiple configuration profiles depending on the detected attribute of the remote device to configure the given communication port.

18 Claims, 7 Drawing Sheets

METHODS AND APPARATUS TO CONFIGURE A COMMUNICATION PORT

BACKGROUND

Computerized devices such as computer systems, workstations, data communications devices (e.g., routers, switches, hubs, and the like) or other electronic devices are typically programmable. That is, they typically include configurable state information within the device that controls an aspect of operation. As an example, a computerized device may include programmable ports for communicating with a peripheral device attached via a cable.

Certain ports of programmable computerized devices are configured depending on the type of device attached to the port. For example, a USB (Universal Serial Bus) port of a PC (Personal Computer) typically may support communication with one of many different types of devices by configuring itself to communicate depending on the type of peripheral device (such as a camera, printer, etc.) attached to the port. Typically the device is attached to the port via a cable. In practice, after a peripheral device is plugged into the USB port, the PC device receives a code from the peripheral device identifying its type (e.g., whether it is a camera or a printer). In response, the PC searches for a device driver to configure the port for communicating with the detected type of peripheral device. If the device driver is not stored locally, the PC may prompt a user to visit a website from which an appropriate device driver may be downloaded to program the port for communication with the peripheral device.

Ports of a network device such as a router are typically programmable to support communication with other attached devices through corresponding network cables. One method of programming communication ports is to employ a network administrator to physically identify types of peripheral devices connected to the network device. Thereafter, the network administrator manually programs the ports of the network device accordingly to support future communications with the peripheral devices.

SUMMARY

Unfortunately, there are deficiencies associated with conventional techniques of configuring communication ports of a network communication device such as a router, switch, hub, etc. For example, as enterprise and campus networks become larger and larger, it is becoming increasingly difficult to manage configuration of communication ports that support communication with many different types of devices.

As mentioned, one conventional method of maintaining port configurations is to employ a network administrator such as a junior engineer to track each of multiple different types of network devices coupled to corresponding communication ports of a communication device such as a switch. Based on knowledge of how each network device (to be coupled to the communication device) is configured, the network administrator can identify a corresponding profile including communication port parameter settings to program a communication port of the conventional communication device. Unfortunately, this can be a laborious procedure, especially when the conventional data communication device includes hundreds or even thousands of communication ports for communicating with as many or more corresponding network devices (including host devices such as servers or personal computers). This means that a junior engineer potentially would have to manually program thousands of communication ports. Additionally, it may be necessary to track different configuration profiles for each of many different potential types of remote devices coupled to the communication device.

In the event that a communication device coupled to many other remote network devices is replaced with new hardware (or software), there may be a long delay before each of many communications ports of the conventional communication device can be manually programmed for communicating again. Typically, ports of certain conventional network devices are already programmed to communicate according to default settings. However, communication ports usually require special settings for providing optimal communications with a corresponding remote device.

In most circumstances, network administrators do not want to worry about how to program communication ports except for the rarest of cases. Instead, administrators would prefer to be able to connect a remote network device directly to a data communication device (via an appropriate network cable or wireless link) without having to manually configure each of the corresponding communication ports.

It is an advancement in the art to provide an apparatus and method for dynamically or automatically configuring a data communication device without having to manually configure policies and parameters of each communication port. Accordingly, one embodiment of the present invention involves providing functionality in a data communication device to automatically configure its own ports based on attributes of devices with which it communicates. More specifically, the data communication device employs at least one processor to monitor a communications protocol associated with a remote device on a given communication port of the data communication device without participating in the communications protocol. Based on the monitored communications, the processor detects an attribute such as a network address associated with the remote device. In response to detecting the attribute of the remote device, the processor retrieves one of multiple configuration profiles corresponding to the detected one or multiple attributes of the remote device. Thereafter, the processor of the data communication device configures the given communication port of the data communication device with the retrieved configuration profile to support future communications with the remote device.

According to one embodiment, the processor monitors initial communications with the remote device based on a particular communications protocol. For example, the remote device generates one or more messages to the data communication device of this embodiment after it is connected via a network cable (or wireless link) to a port of the data communication device. The data communication device monitors the initial communications with the remote device without participating in the protocol. For example, the data communication device does not specifically send a message to the remote device requesting how to configure the port. Instead, the data communication device monitors the initial (or subsequent) communications to identify attributes of the remote device. In response to detecting an attribute of the remote device, the processor automatically sets (by selecting an appropriate configuration profile) a corresponding port of the communication device for future communication with the remote device through the communication port. In this way, the data communication device can automatically configure its own communication ports with reduced manual human intervention. The automatic configuration can be achieved by snooping one or more protocols that take place when coupling the remote device to the communication port via a network cable or wireless link.

The data communication device may include many communication ports for communicating with multiple different types of remote devices. Each device may communicate via a same or different protocol. Consequently, the data communication device is optionally programmed to monitor and detect of at least one of multiple communications protocols potentially associated with the remote device. For example, processing in the data communication device may include applying multiple attribute discovery mechanisms (such as detecting that a network address associated with the remote device is within a specified range, detecting an aspect of a user authentication procedure, detecting a change in a network address, etc.) to identify a corresponding configuration profile to configure a communication port for communicating with the remote device. This technique of applying multiple attribute discovery mechanisms at a centrally located communication device ensures that a larger percentage of types of remote devices can be identified for automatically programming corresponding ports of the data communication device.

According to one embodiment of the present invention, detecting an attribute of the remote device includes determining a network address such as an IP (Internet Protocol) or MAC (Media Access Control) address or detecting a change taking place in the network address associated with the remote device. Based on determining the network address (or change in the network address), the processor of the data communication device refers to a lookup table to identify a particular type associated with the remote device. The data communication device then retrieves a configuration profile (from local memory or remote memory accessible over a network link) depending on the identified type of remote device to configure the corresponding communication port for future communications. Configuring the communication port in this way reduces or potentially eliminates the manual task of reprogramming a communication port to support further communications.

In addition to identifying a network address (indicating a type of remote device) or change thereof, detecting an attribute of the remote device indicating its type may include monitoring at least one of the following: 802.1x user authentication, CDP (Cisco Discovery Protocol), MAC address/subnet mask assignment, IP address assignment, DHCP (Dynamic Host Control Protocol) response, ACL (Access Control Lists), and hardware and software associated with the remote device.

The configuration profiles for setting communication ports of the data communication device can be 'pulled' or 'pushed' from a remote network node. For example, the data communication device may poll a network node for updated configuration profiles. In response to polling and identifying that updated configuration profiles are available from the remote network node, the data communication device retrieves (pulls) the updated configuration profiles and stores the updated configuration profile from the network node to local memory of the data communication device. In another embodiment, the data communication device receives a message at the data communication device from a network node indicating availability of updated configuration profiles. The network node then transmits the updated configuration profiles to the data communication device for storage in its local memory.

In one embodiment, the configuration profiles are remotely stored at one or multiple nodes of a network accessible to the data communication device over a network link. Thus, to configure or reconfigure a communication port, the data communication device retrieves a configuration profile from the network node instead of its local memory. Storing or distributing the configuration profiles at one or multiple accessible nodes of a network alleviates the data communication device from having to locally store the communication profiles.

Configuration profiles may be distributed amongst multiple nodes of a network. Consequently, if the data communication device cannot find a particular configuration profile at a particular node of a network, another source of the network may be queried to locate an appropriate configuration profile. A network node may also identify another node that does store the configuration profile.

It is possible that a configuration profile may not exist for a particular type of remote device. In such an instance, the communication device optionally programs a communication port with a default configuration profile. A default configuration profile for each type of remote device may be stored locally on the communication device or stored in the network.

A configuration profile typically includes information indicating how to set at least one parameter of the given communication port to support future communications with the remote device. For example, configuring the given communication port of the data communication device with the retrieved configuration profile may include setting one or more of the following port parameters or associated information: protocol type, LACP (Link Aggregation Control Protocol, security policies and parameters (including access control lists or ACLs), UDLD (Uni-Directional Link Detection), Etherchannel, Spanning Tree, and QoS (Quality of Service) policies and parameters associated with communications through the communication port.

One embodiment of the present invention is directed to a computer program product that includes a computer readable medium having instructions stored thereon for configuring communication ports. The instructions, when carried out by a processor of the data communication device, cause the processor to perform the steps of: (i) monitoring a communications protocol associated with a remote device on a given communication port of the data communication device without participating in the communications protocol; (ii) based on the monitored communications, detecting an attribute of the remote device; (iii) in response to detecting the attribute of the remote device, retrieving one of multiple configuration profiles corresponding to the attribute of the remote device; and (iv) configuring the given communication port of the data communication device with the retrieved configuration profile to support future communications.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
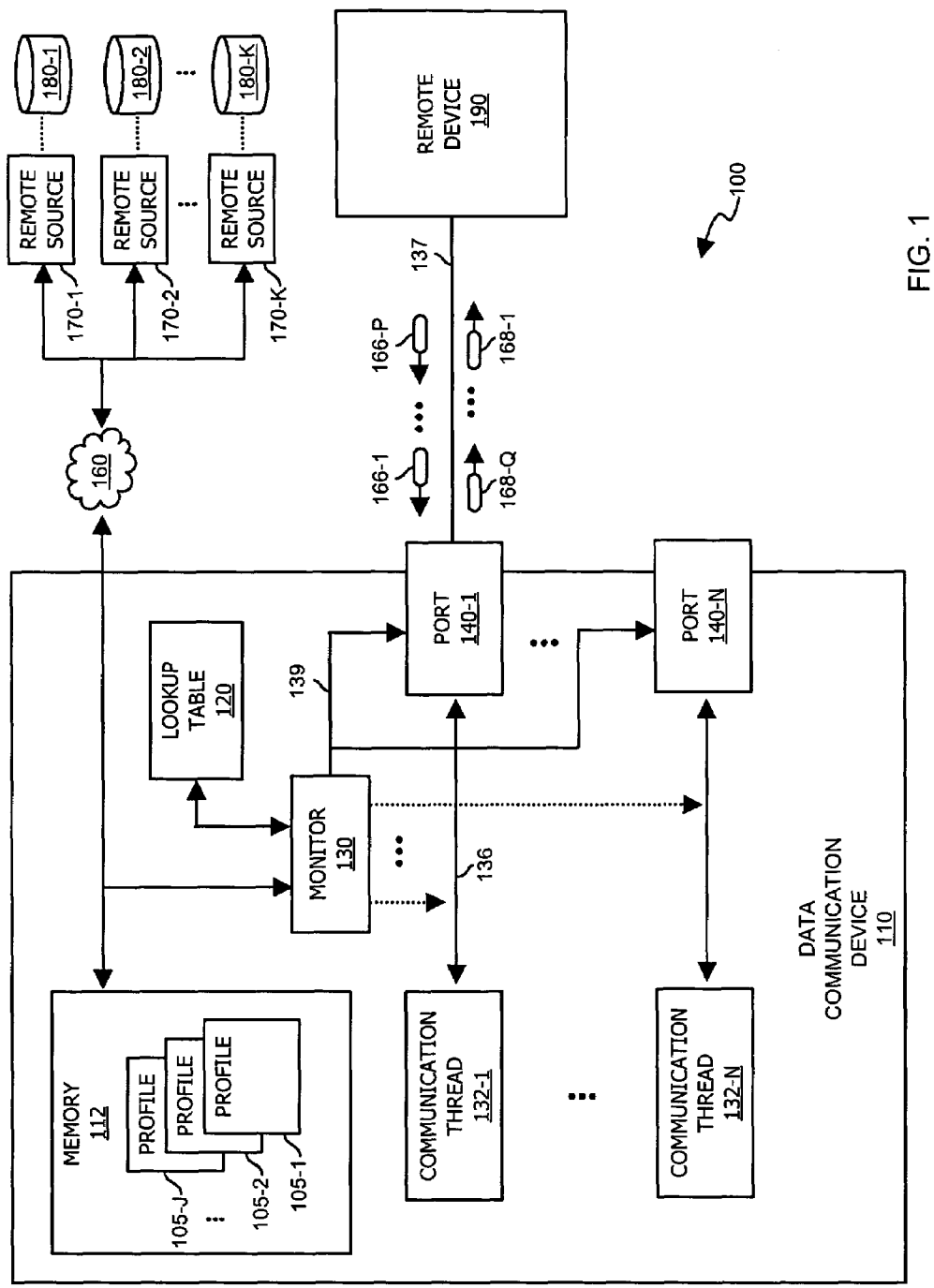
FIG. 1 is a functional block diagram illustrating a communication system including a data communication device that configures its communication ports according to an embodiment of the invention.

Enterprise and campus networks have grown to become quite large and it has thus becoming increasingly difficult to manage configuration of a multi-port communication device (such as a switch) supporting communication with many different types of devices. For example, manually programming each port of the multi-port communication device can be a laborious procedure, especially when the data communication device includes hundreds or even thousands of communication ports for communicating with many corresponding different network devices. Merely connecting hundreds or thousands of remote network devices to corresponding communication ports of a central communication device may be a daunting task.

One embodiment of the present invention involves providing functionality in a data communication device to automatically configure its own ports based on attributes of corresponding devices with which it communicates. In general, the data communication device monitors a communications protocol supporting communication with a remote device through a given communication port of the data communication device. For example, the data communication device passively monitors the communications without actually participating (or interfering) in the communications protocol to glean information about how to set a corresponding communication port for future communications. In one application, a monitor of the communication device monitors content of data packets received form the remote device. Based on this technique, certain existing communication protocols need not be modified to include an additional routine for detecting how to set attributes of the communication port. Instead, the communication device merely monitors the communications with a remote device and, based on gleaned attributes of the remote device, sets parameters of the corresponding communication port accordingly. Note that the switch (e.g., data communication device) does participate in the 802.1X authentication with the remote device. However, it snoops on the attributes exchanged by the authentication server (associated with 802.1X authentication) and the remote device in order to identify the specific configuration profile. The 802.1X authentication may be initiated by the remote device and/or by the communication device.

In response to detecting an attribute of the remote device based on monitoring the communication protocol, the at least one processor retrieves one of multiple configuration profiles corresponding to the attribute (or attributes) of the remote device. Thereafter, the at least one processor configures the given communication port of the data communication device with the retrieved configuration profile to support future communications with the remote device. This technique of automatically configuring ports alleviates a network administrator from having to manually program parameters of each communication port.

Although the techniques described herein can be used in networking applications, and particularly to data communications devices that provide connectivity to many remote devices through a network link, the techniques are also well-suited for other applications as well.

FIG. 1 is a block diagram of communication system 100 according to an embodiment of the present invention. As shown, communication system 100 includes data communication device 110 (such as a router, switch, hub, or network node), network 160, remote sources 170-1, 170-2, . . . , 170-K, corresponding storage devices 180-1, . . . , 180-K, and remote device 190. Data communication device 110 includes ports 140-1, . . . , 140-N, monitor 130, lookup table 120, communication threads 132-1, . . . , 132-N, memory 112, and (configuration) profiles 105-1, 105-2, . . . , 105-J.

In the context of a router or switch, data communication device 110 receives data packets 166-1, . . . , 166-P (such as TCP/IP data packets) from remote device 190 through communication port 140-1 to communication thread 132-1. In an opposite direction, data communication device 110 transmits data packets 168-1, . . . , 168-Q generated by communication thread 132-1 through communication port 140-1 to remote device 190. In general, communication threads 132 process received data packets (by analyzing data in certain data fields) and determine what to do with them. For example, during operation, communication threads 132 may support logical connections between data communication device 110 and remote device 190. In the context of a router or switch, data packets 166 received on port 140 of data communication device 110 can be processed and retransmitted through another port 140 to another network device in communication with data communication device.

Communication link 137 such as a hard-wired network cable (twisted pair of wires, fiber optic cables, coaxial cable, . . . ) or wireless link (Radio Frequency Inductive Coupling, etc.) provides a medium by which to transmit data packets 166, 168 between data communication device 110 and remote device 190.

In general, monitor 130 monitors communications through port 140-1 such as at network layer 2. Based on monitoring of communications 136, monitor 130 detects attributes of remote device 190 and, in response, sets parameters of port 140-1 via control signals 139. According to one embodiment, monitor 130 traverses look up table 120 to identify (based on one or multiple detected attributes) which of multiple configuration profiles 105 shall be used to program a corresponding port 140. After monitor 130 retrieves the appropriate configuration profile 105 from memory 112 or remote source 170, monitor 130 configures ports 140 of data communication device 110.

In one embodiment, configuration profiles 105 are stored (or distributed) at one or multiple remote network nodes (e.g., remote sources 170 and associated storage devices 180) accessible by data communication device 110, in addition to or in lieu of storing configuration profiles 105 locally in memory 112. When configuration profiles 105 are located at a remote access node, data communication device 110 communicates over network 160 to retrieve configuration profiles 105 stored in storage device 180. Remote source 170-1 is optionally a server that processes requests from data communication device 110 for configuration profiles 105. Configuration profiles 105 are generated by senior network administrators that define a policy for communicating through communication ports 140.

In furtherance of storing configuration profiles 105 remotely with respect to data communication device 110 according to one embodiment, configuration profiles 105 are distributed throughout network nodes accessible by data communication device 110. If a configuration profile 105 can not be found at remote source 170-1 such as a repository of configuration profiles 105, data communication device 110 may query other nodes or even receive a message from remote source 170-1 indicating a network address for finding a requested configuration profile 105.

Figure 2:
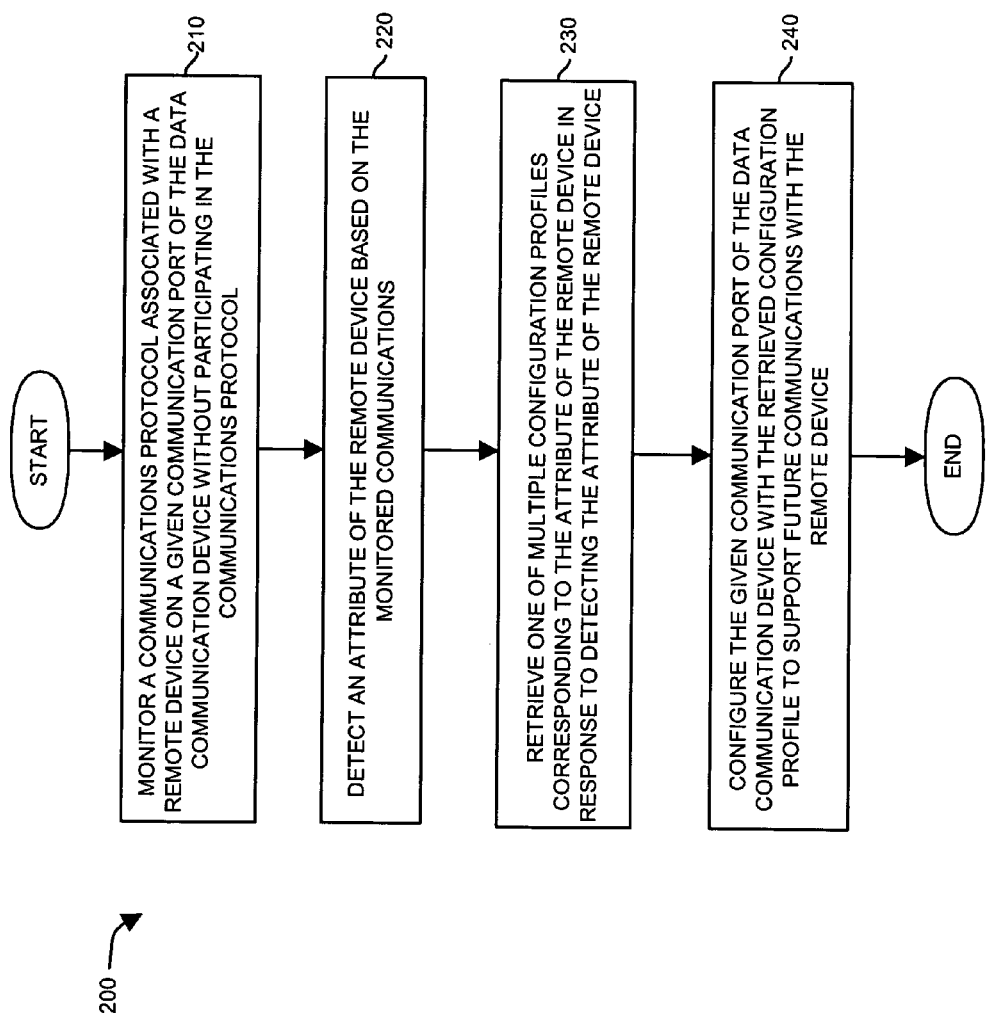
FIG. 2 is a flow chart illustrating a technique for configuring one or multiple communication ports according to an embodiment of the invention.

The process of configuring communication ports 140 with a retrieved configuration profile 105 is additionally described in connection with flow chart 200 in FIG. 2. For example, as shown in step 210 of FIG. 2, monitor 130 monitors communications 136 such as communications protocol associated with remote device 190 on a given port 140 of data communications device 110. In one embodiment, monitor 130 does not participate in actual communications but instead passively listens to communications 136 to detect attributes of remote device 190 and how a corresponding communication port 140-1 should be programmed. Monitoring may include analyzing data fields of received and transmitted data packets 166, 168 respectively.

In step 220, monitor 130 detects an attribute of remote device 190 such as its type (e.g., type of hardware, software, preferred protocol for communicating) based on monitoring communications 136.

In step 230, monitor 130 retrieves one of multiple configuration profiles 105 corresponding to the detected attribute of remote device 190 and/or communications 136. Thereafter, in step 240, monitor 130 configures port 140-1 according to the retrieved configuration profile 105 to support future communications (such as transmitting and receiving respective data packets 166, 168) with remote device 190.

Figure 3:
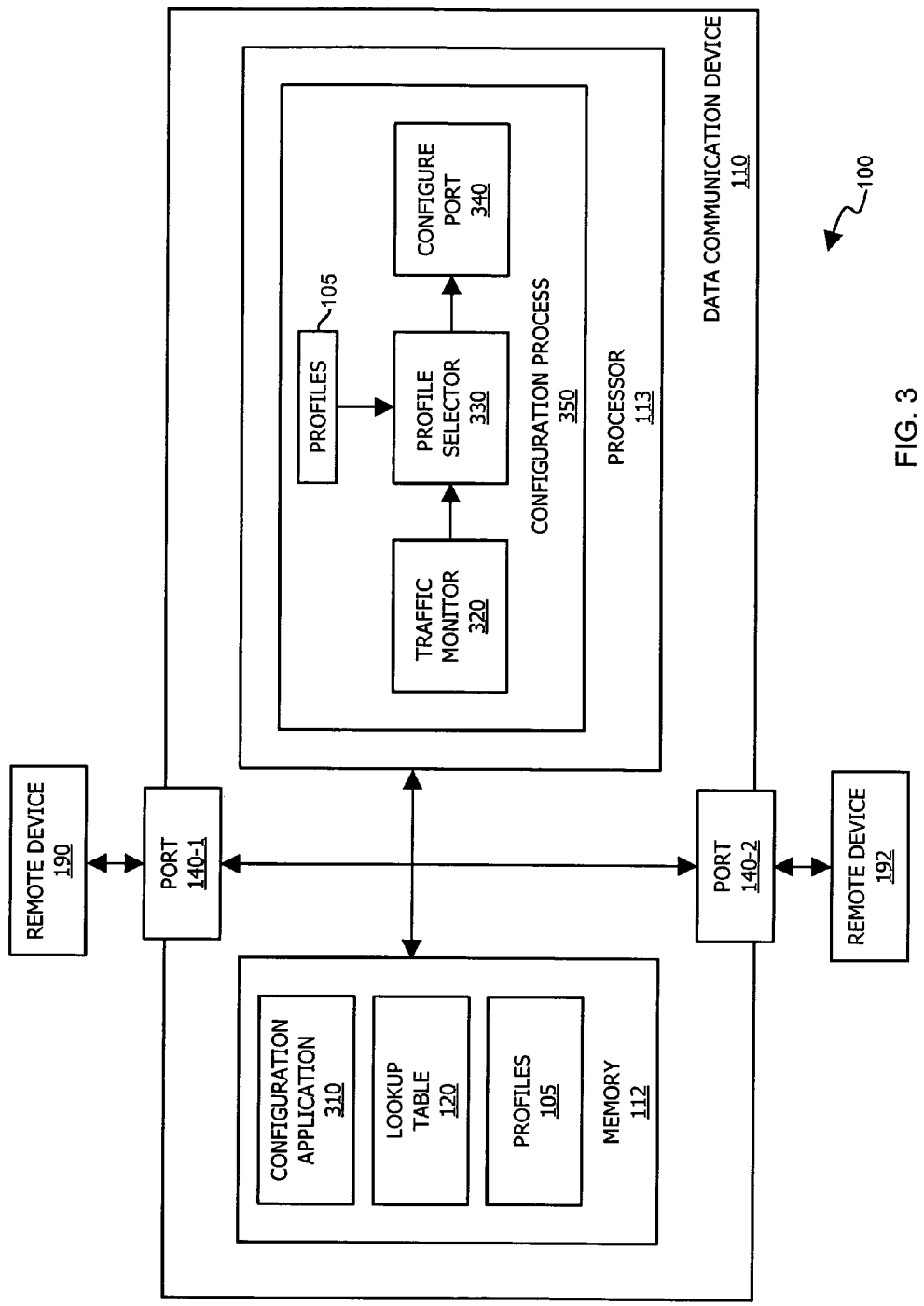
FIG. 3 is a system block diagram of a data communication device that configures its communication ports according to an embodiment of the invention.

FIG. 3 is a hardware implementation of communication system 100 including software modules according to an embodiment of the present invention. As shown, data communications device 110 includes respective ports 140-1 and 140-2 (additional ports are shown in FIG. 1) to couple remote device 190 with remote device 192. Data communication device 110 includes memory 112 to store configuration application 310, lookup table 120, and configuration profiles 105. Processor 113 executes instructions of configuration application 310 to implement configuration process 350. In general, configuration process 350 includes software modules for configuring one or multiple ports 140 as previously discussed. For example as specifically illustrated, configuration process 350 includes: traffic monitor 320 to monitor communications 136, profile selector 330 to identify and retrieve an appropriate configuration profiles 105, and configure ports module 340 to program settings of ports 140 based on detected attributes of remote device 190.

Figure 4:
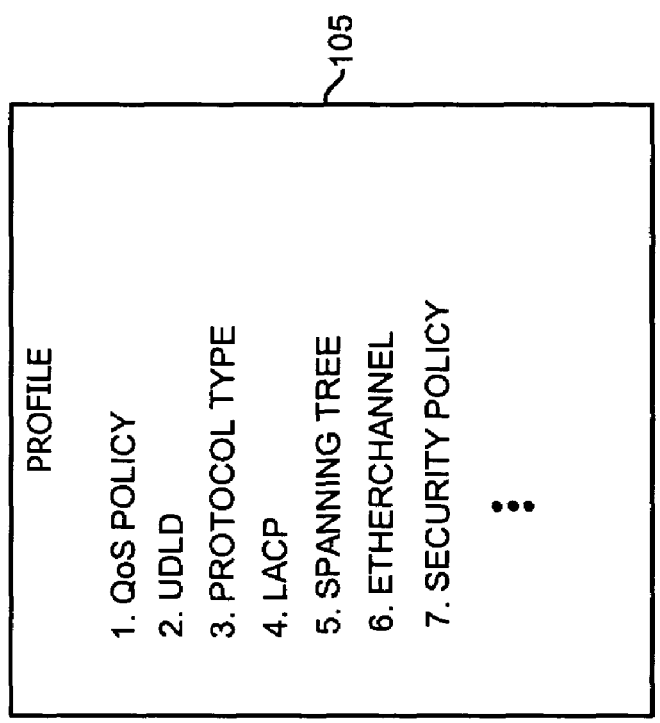
FIG. 4 is a diagram of a profile illustrating potential policy/attribute settings for configuring a communication port according to an embodiment of the invention.

FIG. 4 is a sample configuration profile 105 including multiple potential types of parameter settings for a particular port 140 of communication device 190. Each configuration profile 105 may include one or multiple types of parameter settings.

One type of port setting (of communication port 140) is Quality of Service (QoS). Quality of Service defines a relative priority class and/or assigned data bandwidths for processing (re-transmitting) and/or metering data packets through port 140 of data communication device 110 to one or more of potentially hundreds or thousands of devices coupled to data communication device 110.

Configuration profile 105 may include a setting whether to implement a UDLD (UniDirectional Link Detection) protocol. In general, the UDLD protocol monitors the physical configuration of cables and detects when a uni-directional link exists potentially due to a failure. If such a link is detected, implementation of the UDLD causes an appropriate port to shut down and alerts a user.

Additionally, configuration profile 105 may identify a preferred or expected communication protocol for communicating with remote device 190. For example, configuration profile 105 may identify whether a port 140 shall support LACP (Link Aggregation Control Protocol), Spanning Tree Protocol, VLANs (Virtual Local Area Networks), routing protocols, security policies and parameters, ACLs, and/or the Fast Ether Channel protocol.

After configuring a given communication port 140-1 in response to detecting an attribute of remote device 190, data communication device 110 optionally notifies the remote device that the given communication port 140-1 has been configured. Thus, remote device 190 receiving such a notification may thereafter adjust some of its own settings. In one embodiment, the notification may include information indicating how to set parameters of a port associated with remote device 190.

Figure 5:
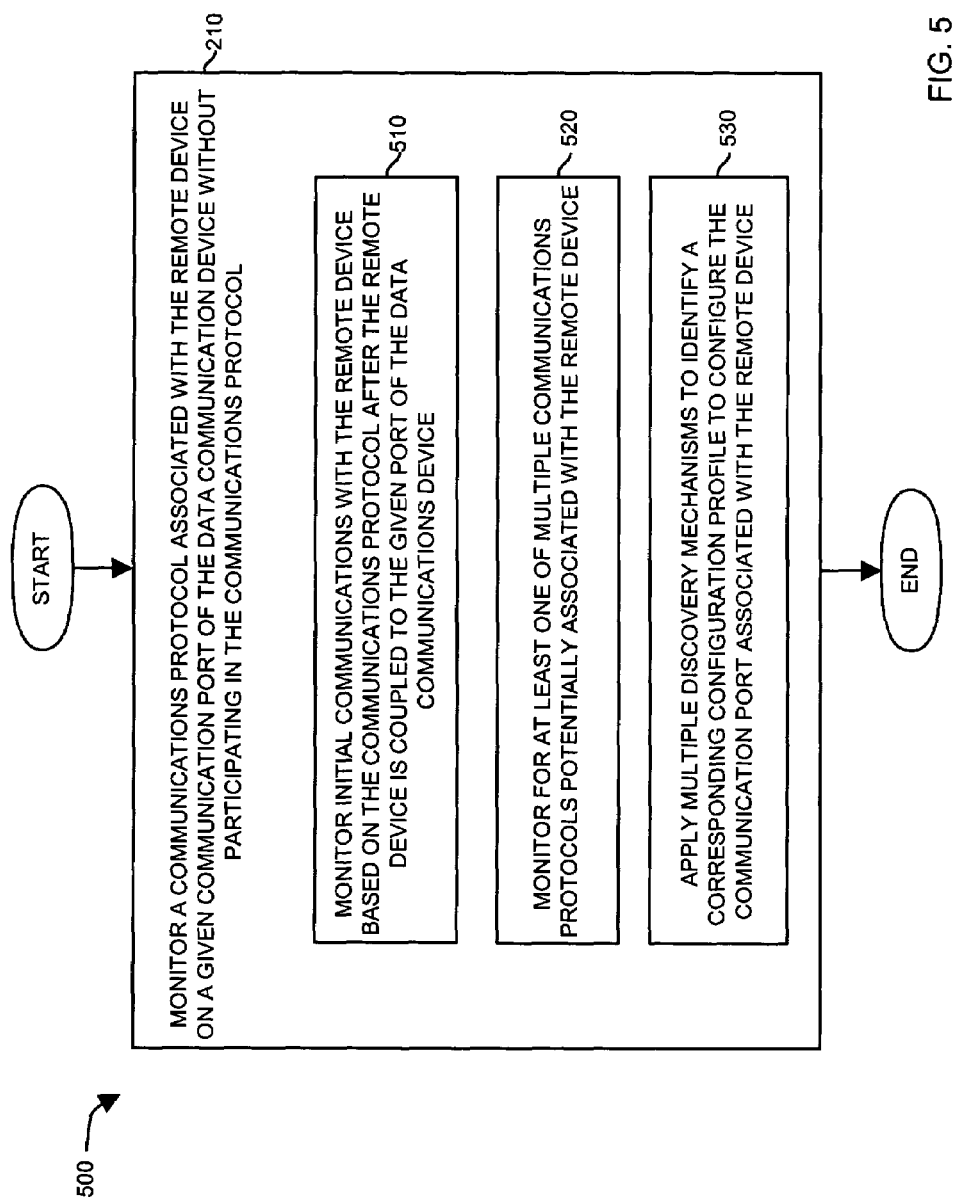
FIG. 5 is a flow chart illustrating a technique for configuring a communication port according to an embodiment of the invention.

FIG. 5 is a flow chart illustrating more detailed steps associated with monitoring communications according to embodiments of the present invention. For example, in step 210 as previously discussed, data monitor 130 monitors one of multiple potential communications protocols associated with remote device 190 without participating in the protocol. In other words, one embodiment of the invention involves passively monitoring communications 136 without explicitly sending a message form data communication device 110 requesting how to set communication port 140-1 for transmitting and receiving messages 166, 168. Thus, a communication port may be reconfigured even if a protocol for communicating with remote device 190 does not support explicit commands or messages from remote device 190 or an exchange of messages with remote device 190 for configuring a port 140. Instead, monitor 130 monitors contents of data packets to determine how to program a configuration port. For example, it may be known that a range of network addresses corresponds with a specific type of product manufactured by a particular company. Each of the products in a specified range of network addresses may require similar types of communication port 140 settings. In this way, monitor 130 can identify which of multiple configuration profiles to select based on a network address detected in communications from remote device 190.

Other embodiments of the invention include actively (or explicitly) transmitting or receiving messages to and/or from remote device 190 for setting corresponding communication ports 140.

As illustrated in step 510, monitor 130 optionally monitors initial communications with remote device 190 after it is coupled to data communication device 110 via communication link 137. Remote device 190 may generate first message 166-1 (such as a TCP/IP data packet) to data communication device 110 in response to being coupled via link 137. Monitor 130 detects attributes of first message 166-1 (and potentially messages 166-2 . . . 166-p that follow) to determine how to configure or set parameters of communication port 140.

Additionally, monitor 130 monitors communications 136 which occur well after coupling remote device 190 to port 140-1 via link 137. For example, monitor 130 may detect a change in MAC (Media Access Control) address days or months after initially coupling remote device 190 to data communication device 110 via communication link 137.

According to one embodiment, monitor 130 monitors communications on communication link 137 for at least one of multiple potential protocols or attributes because it may not initially be known what type of remote device 190 is attached to data communication device 110. Depending on the application, remote device 190 may be a switch, an IP (Internet Protocol) phone, a generic host, a mainframe, a departmental server, a mail server, a router, a Firewall, a network attached storage device, etc. Thus, data communication device 110 may identify which of multiple types of remote device 190 are coupled through communication link 137 to port 140-1. Consequently, data communication device 110 may automatically program communication ports 140 differently depending on the type of remote device 190 detected. For example, a remote device 190 such as an IP phone is optionally powered by communication device 110 through communication link 137.

When data communication device 110 supports multiple types of communication devices, monitor 130 monitors for detection of at least one of multiple potential different types of protocols or attributes. This technique in step 520 of monitoring for one of multiple potential protocols or attributes increases a number of ports 140 that are likely to be automatically programmed or configured in response to detecting a corresponding attribute of remote device 190 based on monitoring communications 136. For example, if monitor 130 of data communication device 110 monitored only a single attribute of a specific type of remote device 190, then only those communication ports 140 associated with those types of remote devices 190 could be automatically programmed via control signals 139. Thus, according to one embodiment of the invention, many more ports 140 of communication device 110 can be programmed because monitor 130 monitors a presence of multiple different types of attributes rather than merely a single attribute.

In step 530, data communication device 530 applies multiple discovery mechanisms to identify attributes (such as a change in MAC or IP network address, specific attribute of an authentication process, change in a hardware or software setting of remote device 190, etc.) for configuring a corresponding communication port 140 with a configuration profile 105. An additional list of attributes is more particularly shown in step 630 of FIG. 6.

Referring again to step 530 in FIG. 5, the attribute discovery mechanisms employed by monitor 130 detect attributes of remote device 190 based on at least one of the following: 802.1x user authentication, receipt of CDP (Cisco Discovery Protocol) messages, MAC address/mask assignment, IP address/subnet mask assignment, DHCP (Dynamic Host Configuration Protocol) responses, ACL (Access Control List), hardware and software settings of remote device 190, and change in network address associated with remote device 190.

Notably, monitor 130 may monitor communications 136 for multiple attributes before configuring a corresponding communication port 140. For example, data communication device 110 (monitor 130) may detect a change in a network address associated with remote device 190. Additionally, monitor 130 may detect a DHCP snoop response or CDP device type based on communications 136. As discussed, monitor 130 utilizes look-up table 120 to identify corresponding configuration profiles associated with the detected attributes of remote device 190. In the case of detecting multiple attributes of remote device 190, monitor 130 may configure communication port 140-1 if the detected attributes correspond to a common configuration profile 105. If not, a detected attribute having a higher associated priority is used to identify which of multiple configuration profiles 105 (corresponding to multiple detected attributes of remote device 190) shall be used to program port 140-1.

Figure 6:
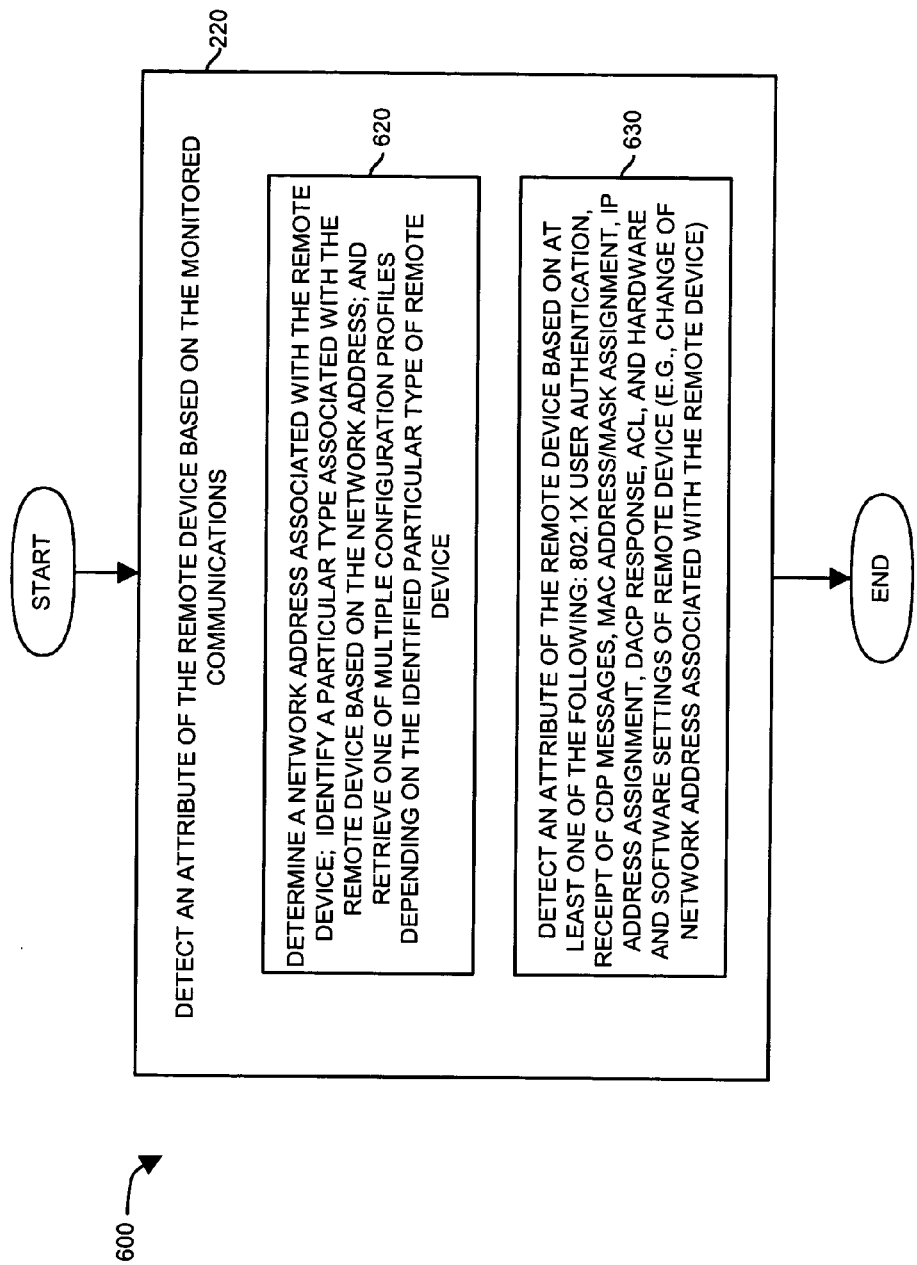
FIG. 6 is a flow chart illustrating a technique for configuring a communication port according to an embodiment of the invention.

FIG. 6 is a flow chart illustrating additional features associated with detecting an attribute of remote device 190 according to embodiments of the present invention.

In step 620, data communication device 110 configures port 140-1 depending on a network address associated with remote device 190. For example, monitor 130 determines a network address associated with communications 136 by passively listening to communications 136. Based on a detected network address, monitor 130 retrieves a configuration profile 105 to program the port for future communications.

In step 630, monitor 130 detects an attribute of remote device 190 as previously discussed.

Figure 7:
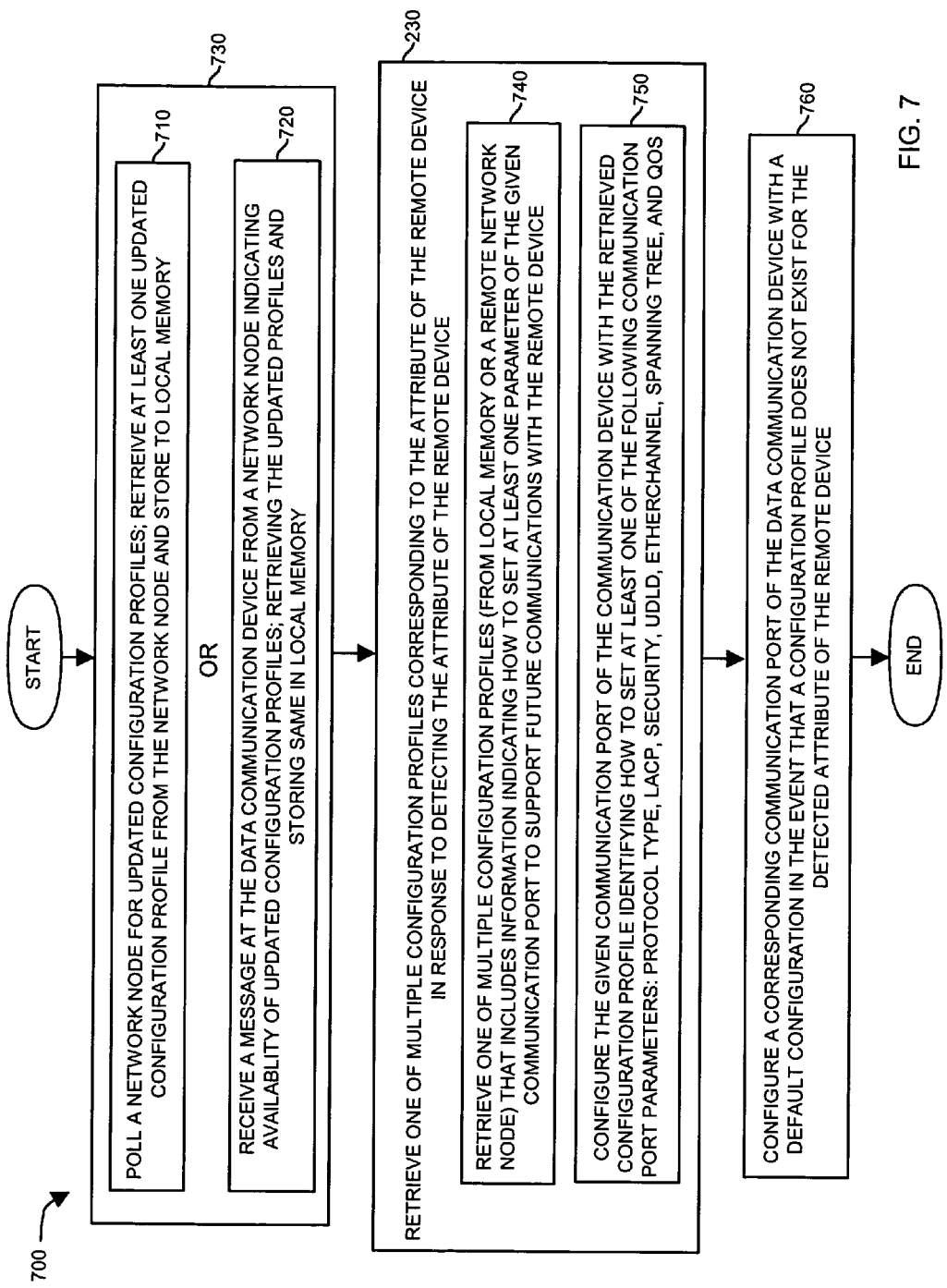
FIG. 7 is a flow chart illustrating a technique for configuring a communication port according to an embodiment of the invention.

FIG. 7 is a flow chart illustrating additional features according to embodiments of the present invention.

In step 710, data communication device 110 polls a network node such as remote source 170-1 for updated or new configuration profiles 105 provided by, for example, a network administrator. Alternatively, in step 720, data communication device 110 receives a message from a network node such as remote source 170-2 indicating availability of updated or newly created configuration profiles 105. Thereafter, in steps 710 and 720, data communication device 110 retrieves the updated profiles 105 and stores them in memory 112. Thus collectively, steps 710 and 720 (or step 730) involve 'pushing' or 'pulling' configuration profiles 105 from a remote access node such as remote source 170-1 for storage in local memory 112.

As previously discussed in connection with FIG. 2, step 230 includes retrieving one of multiple configuration profiles 105 associated with remote device 190 to program communication port 140-1 supporting communications 136. According to an embodiment as in FIG. 7, step 230 optionally includes steps 740 and 750.

In step 740, a retrieved configuration profile 105 includes information how to set one or multiple parameters of communication port 140-1 for communications (such as messages 166, 168) with remote device 190. As illustrated in step 750, setting a parameter of communication port 140 may include configuring port 140 to support a specific protocol type, security (e.g., firewall), UDLD, Ether Channel, LACP, Spanning Tree, Quality of Service, etc.

In step 760, if a configuration profile 105 does not exist for a detected attribute of remote device 190, a default configuration profile 105 is optionally retrieved from remote source 170-1 or local memory 112 to configure communication port 140-1 according to default settings.

In summary, techniques of the present invention reduce a time it takes to configure one or multiple communication port to support future communications. Because ports are automatically configured in response to identifying attribute of the remote device, an administrator therefore does not need to worry about manually configuring each and every communication of the communication device.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. In a data communication device including multiple communication ports, a method of configuring at least one of the communication ports, the method comprising:

monitoring a communications protocol associated with a remote device on a given communication port of the data communication device without participating in the communications protocol;

detecting that the remote device uses a particular protocol in which to communicate through the given communication port with a network resource;

based on the monitored communications, detecting an attribute of the remote device;

in response to detecting the attribute of the remote device, retrieving one of multiple configuration profiles corresponding to the attribute of the remote device; and configuring the given communication port of the data communication device with the retrieved one of multiple configuration profiles to support future communications with the remote device, wherein configuring the given communication port includes configuring the given communication port to communicate using the particular protocol used by the remote device to communicate through the given communication port.

2. The method as in claim 1, wherein monitoring communications with the remote device on the given communication port includes:

monitoring initial communications with the remote device based on the communications protocol after coupling the remote device to the data communication device via the given communication port.

3. The method as in claim 1 further comprising:

in the event that a configuration profile does not exist for the detected attribute of the remote device, configuring a corresponding communication port of the communication device with a default configuration profile.

4. The method as in claim 1 further comprising:

polling a network node for updated configuration profiles; and in response to polling, storing at least one of the updated configuration profiles from the network node to local memory of the data communication device.

5. The method as in claim 1 further comprising:

receiving a message at the data communication device from a network node indicating availability of updated configuration profiles; and receiving the updated configuration profiles from the network node to local memory of the data communication device.

6. The method as in claim 1, wherein detecting the attribute of the remote device includes:

determining a network address associated with the remote device;

identifying a particular type associated with the remote device; and wherein retrieving one of multiple configuration profiles includes retrieving a configuration profile depending on the identified particular type of remote device.

7. The method as in claim 6, wherein detecting the attribute of the remote device indicating its type includes detecting an attribute based on at least one of: 802.1x user authentication, CDP (Cisco Discovery Protocol), MAC address/mask assignment, IP address assignment, DHCP (Dynamic Host Configuration Protocol) response, ACL (Access Control Lists), and hardware and software associated with the remote device.

8. The method of claim 6, wherein identifying the particular type associated with the remote device includes detecting that the network address assigned to the remote device falls within a range of network addresses, each of multiple similar types of remote devices having an assigned address in the range requiring similar types of communication port settings; and wherein identifying the particular type associated with the remote device comprises determining the particular type based on knowing a type associated with the multiple remote devices that have a corresponding network address falling within the range.

9. The method as in claim 1, wherein detecting the attribute of the remote device includes:

detecting a change in a network address associated with the remote device.

10. The method as in claim 1, wherein retrieving one of multiple configuration profiles includes retrieving one of multiple configuration profiles that includes information indicating how to set at least one parameter of the given communication port to support future communications with the remote device.

11. The method as in claim 10, wherein configuring the given communication port of the data communication device with the retrieved configuration profile includes setting the given port of the data communication device based on at least one of the following parameter types: protocol type, LACP (Link Aggregation Control Protocol, security policies, security parameters, access control lists, UDLD (Uni-Directional Link Detection), Etherchannel, Spanning Tree, VLANs (Virtual Local Area Networks), routing protocols, and QoS (Quality of Service).

12. The method as in claim 1 further comprising:

storing the multiple configuration profiles at a network node accessible to the data communications device over a network link; and wherein retrieving the configuration profile includes obtaining a configuration profile from the network node accessible to the data communication device.

13. The method as in claim 1, wherein monitoring communications associated with the remote device includes:

applying multiple attribute discovery mechanisms to identify a corresponding configuration profile to configure the given communication port associated with the remote device, the multiple attribute discovery mechanisms including: i) a first attribute discovery mechanism for discovering an authentication attribute associated with the remote device, and ii) a second attribute discovery mechanism for discovering a change in a setting associated with the remote device.

14. The method as in claim 1, wherein the data communication device is a switch device having the multiple communication ports on which to communicate with multiple different remote devices; and wherein configuring the given communication port includes configuring the given port of the switch device based on learned attributes of the remote device, configuring of the given communication port enabling communications from a source through the given communication port over a network connection to the remote device.

15. The method as in claim 1, wherein the data communication device is a switch device 28 in a network, the method further comprising:

after configuring the given communication port, notifying the remote device that the given communication port of the data communication device has been configured via use of the retrieved one of multiple configuration profiles.

16. The method as in claim 15 further comprising:

in response to configuring the given communication port with the retrieved one of multiple configuration profiles, notifying the remote device how to set parameters associated with a port of the remote device.

17. A method as in claim 1, wherein detecting the attribute of the remote device comprises detecting a first attribute of the remote device, the method further comprising:
- detecting a second attribute associated with the remote device;
- identifying a higher associated priority of the first attribute and the second attribute;
- utilizing one of the first attribute and second attribute having the identified higher associated priority in which to identify a corresponding configuration profile for configuring the given communication port.

18. A method as in claim 1, wherein the data communication device is a switch device and wherein configuring the given communication port comprises:
- identifying a quality of service as specified by the retrieved one of multiple configuration profiles; and
- setting the given communication port to support the quality of service as specified by the as specified by the retrieved one of multiple configuration profiles.

* * * * *